Nov. 29, 1966 R. HOFFMAN 3,287,751
PLIER-TYPE CUTTING AND GRIPPING TOOL
Filed Nov. 2, 1964
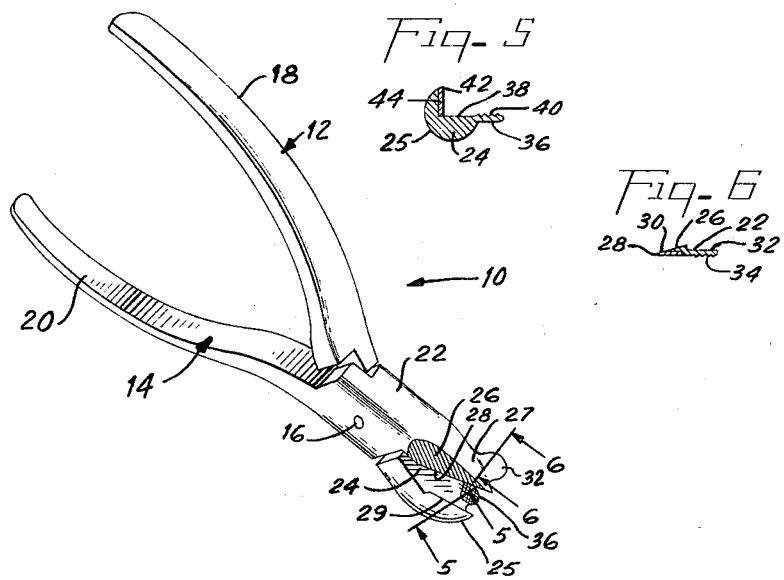
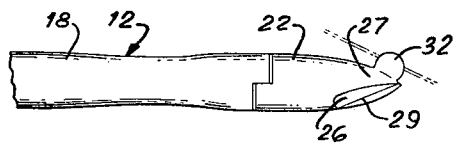
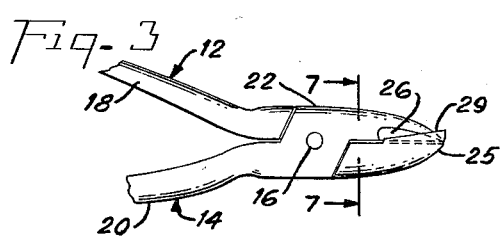
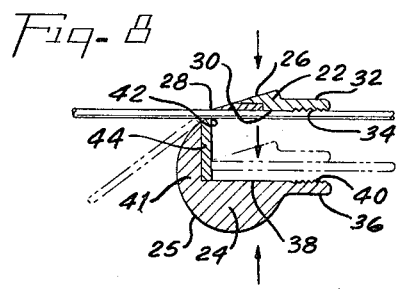
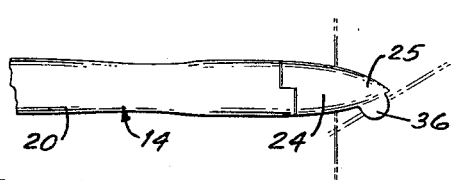
INVENTOR.
ROBERT HOFFMAN
BY
ATTORNEYS

United States Patent Office 3,287,751
Patented Nov. 29, 1966

3,287,751
PLIER-TYPE CUTTING AND GRIPPING TOOL
Robert Hoffman, 17 Copper Beech Place, Merrick, N.Y.
Filed Nov. 2, 1964, Ser. No. 407,977
2 Claims. (Cl. 7—5.4)

The present invention relates to pliers generally and in particular to a twisting, cutting and holding plier particularly suited for use in areas of limited space and being particularly adapted for various applications in the medical, surgical, dental and allied fields.

In the past it has often been necessary to employ a multiplicity of instruments in order to accomplish the feat of twisting, cutting and holding wire or thread. In areas of exceedingly limited access, such as in the mouth or within a surgically incised area, the physician, dentist or surgeon often is prevented from employing a multiplicity of instruments unless the surgically incised area is made larger even when the physician, dentist or surgeon is possessed with exceptional manual dexterity.

Accordingly, the primary object of the present invention resides in the provision of a multipurpose instrument which may be employed to hold, twist and cut wire or thread without the need for any other additional instrument to perform the act.

A further object of the present invention is to provide a multipurpose instrument for cutting, twisting and holding which will be simple to operate and which will not require any further or increased degree of manual dexterity to operate and use.

Further, it is an object of this invention to provide a multipurpose instrument for cutting, twisting, and holding wire, thread or the like which will obviate the need for using more than one instrument and which will enable physicians, dentists and surgeons to perform their services in a more efficient manner.

Still further, it is an object of this invention to provide a multipurpose cutting, twisting and holding plier which will enable physicians, dentists and surgeons to accomplish their work in a more efficient manner than heretofore possible in confined areas.

Another object of the present invention is to provide a single instrument which will take the place of numerous separate instruments and will not require as much space to use as would the use of numerous separate instruments.

Still further, it is an object of the present invention to provide a single multipurpose instrument which will take the place of numerous separate single purpose instruments thereby eliminating the need for sterilization of many separate instruments.

Further, it is an object of the present invention to provide a single, multipurpose surgical instrument which will reduce the total number of instruments which must be purchased by each doctor, dentist and surgeon.

Another object of this invention is to provide a single multipurpose surgical instrument which will reduce the total number of instruments which must be employed in an incised area, thereby reducing the possibility of infection.

Still further, it is an object of the present invention to provide a multipurpose cutting, twisting and holding instrument for use in confined areas which will be durable and easily sterilized.

These, together with the various ancillary objects and features of the invention, which will become apparent as the following description proceeds, are attained by this multipurpose cutting, twisting and holding plier, a preferred embodiment of which has been illustrated in the accompanying drawings, by way of example only, wherein:

FIG. 1 is a perspective view of the pliers constructed in accordance with the concepts of the present invention;

FIG. 2 is a plan view of the jaw portions of the pliers illustrating the manner in which the projections of the jaws serve to grasp and hold wire or thread for twisting purposes or the like;

FIG. 3 is a side elevational view of the jaw portion of the pliers illustrating the pliers in a closed position;

FIG. 4 is a bottom plan view of the jaw portions of the pliers;

FIG. 5 is a transverse sectional view in an enlarged scale taken along the plane of line 5—5 in FIG. 1, illustrating the construction of one jaw with its associated blade;

FIG. 6 is an enlarged sectional view taken along the plane of line 6—6 in FIG. 1, illustrating the construction of the other jaw and its associated blade;

FIG. 7 is a transverse sectional view taken along the plane of line 7—7 in FIG. 3, illustrating the jaw in a closed position; and, FIG. 8 is an enlarged transverse sectional view of the jaws illustrated in a partially closed and cutting position.

With continuing reference to the accompanying drawings, wherein like reference numerals designate similar parts throughout the various views, reference numeral 10 generally designates the pliers constructed in accordance with the concepts of the present invention. This pliers includes a pair of closed members 12 and 14 which are pivoted together by a pivot member 16 of generally conventional construction, it being noted that each of the closed members 12 and 14 includes handles 18 and 20 respectively as well as jaws 22 and 24. The under surface 25 of jaw 24 is of a curved configuration. The jaws terminated in beaks 27 and 29 and are relatively short and closely adjacent the pivot 16 for facilitating close in practical applications in orthodontic procedures, such as ligature tying and removing, arch wire clipping, separating wire procedures, surgical ligature procedures, peridontal ligature splintering procedures and all other wire and ligature twisting, cutting and holding procedures.

The location and short length of the jaws eliminates or reduces the possibility of pinching the cheek, lip, gums or other tissues during the use of the pliers in various dental and surgical procedures. Other types of pivotal arrangements for the pliers can be used, including a box joint.

The jaw 22 is provided with a tapered portion 26 which terminates at a cutting edge 28 and the jaw 22 may include a detachable and/or replaceable cutting blade 30 or may be integrally formed in one piece. Integrally attached thereto and extending to the side of the jaw 22 oposite the cutting edge 28 is a projection 32 forming an extension of the flat surface 30. The extension has its surface 34 coplanar with the surface 30. The surface 34 is knurled or serrated for better gripping.

The jaw 24 has a rounded undersurface 25 and is provided with a projection 36 which forms an extension of the flat surface 38 and has its surface 40 knurled or serrated and arranged in complementary opposed relationship to the extension 32.

Integrally formed with the jaw 24 is an upwardly extending portion 41 which extends normal to the flat surface 38 and which is outwardly disposed with respect to the cutting edge 28 of the blade 30 so that the cutting edge 42 of the blade 44, integrally formed or detachably replaceably secured to the upwardly extending portion 40, can provide for cutting relationship with the blade 30.

The pliers 10 are capable of carrying out the functions of twisting the wire, cutting the wire and then holding the free end after it has been cut. From a consideration of the disclosed invention, it will be seen that because of the relative relationship of the jaws 22 and 24, the pliers can accomplish its several functions. With the jaws in a position as shown in FIG. 8, the blades 30 and 42 are arranged for a cutting relationship. In a second position, the beaks 27 and 29 are adapted to hold wire, ligatures or thread in a convenient manner while the projections 32 and 36 facilitate the twisting of the wire or ligatures. Cutting may be performed very close to the working area by using the cutting tips or blades, and general cutting or clipping may be performed by the remaining portions of the cutting edges.

Holding for twisting very close to the working area is facilitated by the projections 32 and 36. General holding is performed either by the projections 32 and 36 or by the flat surfaces 30 and 38 of the beaks 27 and 29. Because of the configuration of the cutting edges and faces of the pliers, the free end of a cut wire will be held after cutting. It is intended that this pliers finds application in the medical and dental professions where wires are twisted, held and/or clipped. This pliers embodies the capabilities for the aforesaid functions both for general applications and in specific instances where such functions are needed very close to the working area, such as within one millimeter of the area.

A latitude of modification, substitution and change is intended in the foregoing disclosure, and in some instances some features of the invention will be employed without a corresponding use of other features. Accordingly, it is appropriate that the appended claims be construed broadly and in a manner consistent with the spirit and scope of the present invention.

I claim:

1. A pliers comprising a first relatively short movable jaw, a second relatively short movable jaw, means pivotally mounting said jaws for movement towards and away from each other, each of said jaws having complementary abutting beaks provided with flat surfaces which abut each other with the jaws in a closed position, said first jaw having a first blade at one edge thereof, said second jaw having a projection disposed outwardly of and extending perpendicularly to the flat surface of said second jaw, said projection terminating in a second blade extending above said flat surface of said second jaw and extending perpendicularly to and cooperating with said first blade to cut material disposed therebetween upon partial closure of said jaws and so that upon further closure of said jaws an end of said material so cut will be grasped between said flat surfaces, and a pair of opposed projections substantially thinner than said beaks having complementary knurled surfaces forming extensions and being coplanar with said flat surfaces of said beaks and extending outwardly from the sides of said jaws opposite to said blades and forwardly of said beaks and at an angle relative to the longitudinal axis of said pliers for facilitating twisting of the material.

2. A pliers according to claim 1, wherein said blades are detachably secured to said jaws.

References Cited by the Examiner

UNITED STATES PATENTS

| | | | |
|---|---|---|---|
| 2,012,648 | 8/1935 | Wheeler | 30—134 |
| 2,134,265 | 10/1938 | Rosenfeld | 128—318 |
| 2,903,790 | 9/1959 | Klein | 30—134 |

WILLIAM FELDMAN, *Primary Examiner.*

R. V. PARKER, *Assistant Examiner.*